H. Ogborn,
Cage Trap,
№ 71,206. Patented Nov. 19, 1867.

Witnesses
C. Danl Howard
Charles Huber

Inventor:
Harrison Ogborn
By Atty: A. C. Klaucke
Atty

United States Patent Office.

HARRISON OGBORN, OF RICHMOND, INDIANA.

Letters Patent No. 71,206, dated November 19, 1867.

IMPROVEMENT IN ANIMAL TRAPS.

*The Schedule referred to in these Letters Patent and making part of the same.*

TO ALL WHOM IT MAY CONCERN:

Be it known that I, HARRISON OGBORN, of Richmond, in the county of Wayne, and State of Indiana, have invented a new and useful Improvement in Rat-Traps; and I do hereby declare the following to be a full, clear, and exact description of the nature, construction, and operation of the same, reference being had to the accompanying drawings, which are made a part of this specification, and in which—

Similar letters of reference indicate corresponding parts in the several figures.

The object of the present invention is to provide a trap of the self-setting class, which shall comprise simplicity, durability, and cheapness of construction, in a degree heretofore unattained, and which shall have such an external appearance as will prevent the animals being frightened off by preliminary inspection.

The invention consists in the employment of a disk or circular plate of metal, as a means for closing and opening the entrance, said disk being mounted upon a tilting bar, which is actuated by the animal after entering the trap, through the medium of an internal arrangement of devices, and upon which said bar the disk is caused to roll up to and away from the entrance, as hereinafter explained. It also consists in the application of straw or hay to the exterior of the trap, for the purpose of preventing suspicion and alarm on the part of the rats.

In order that others skilled in the art to which my invention appertains may be enabled to fully understand and use the same, I will proceed to describe its construction and operation, in connection with the accompanying drawings.

Figure 1:
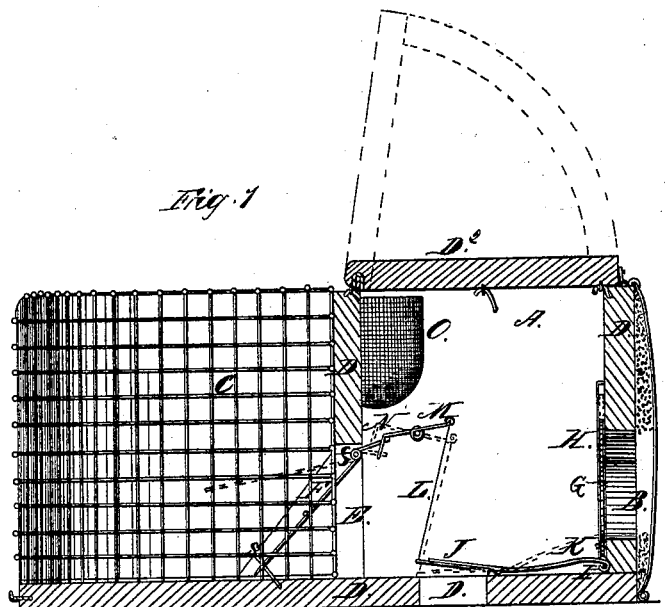
Figure 1 is a vertical longitudinal section of a trap embodying my invention.
Figure 2:
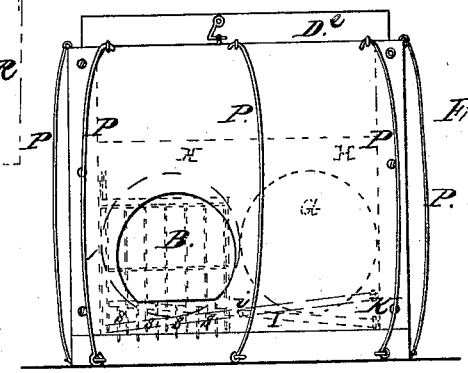
Figure 2 is a front end elevation of the same.

A may represent the front apartment of the trap, into which the animal may pass through the entrance B. C represents a wire cage, joined to the body D of the trap, and communicating with the apartment A through the opening E, the latter being guarded by the wire door F, having pivotal attachment at its upper end by means of the rod $f$. G is a disk or circular plate, confined in its movements between the interior surface of the front wall of the trap D and the retaining plate H. The disk and the retaining plate, as well as the bar I, upon which the disk rests, as shown by dotted lines in fig. 2. The bar I is sustained by a central pivot at $i$, and when said bar is tilted the disk G quickly rolls or traverses toward the depressed end, being arrested in its motion by coming in contact with one or the other side of the trap. It will be seen, by reference to figs. 1 and 2, that the plane in which the disk G is thus allowed to traverse and assume stationary positions, embraces the internal area of the entrance B. Between the entrances B and E of the compartments A and C, is a pivoted section or platform, J, which extends entirely across the floor of the trap, and which is connected with the platform J by the rigid arm K. The pivoted platform J is also connected with the door F, through the medium of the connecting-rod L, lever M, and link N.

The operation of the above-described devices will be readily understood: Supposing the disk G to be in the position represented by the black dotted circle in fig. 2, the entrance B will be open, and the end of the bar I, upon which the disk rests, will be depressed; the door F will be closed, or have its lower end resting upon the floor of the trap, and the arm K will act to hold the platform J in the inclined position represented in black lines, fig. 1. Under this condition of the parts the trap is ready to receive and imprison the rat, which, passing through the entrance B, and across the floor of the trap toward the bait in the receptacle O, steps upon and depresses the platform J, which, by throwing up the arm K, reverses the position of the bar I, as indicated in dotted red lines of fig. 2. As soon as the position of the bar I is thus reversed, the disk G is, by gravity, caused to quickly roll or slide up to the entrance B, which is then closed, as indicated by the red circle in fig. 2. The rat cannot return by way of the entrance B, and naturally seeks egress through the opening E, in the act of which it throws upward the lower end of the hinged door F, which, through the connections L M N, raises the platform J and restores the bar I to its first position, that is to say, the position represented by black lines in fig. 2. Then (the rat having passed into the cage C, and become confined therein by the closing of the door F,) the disk G rolls away from the entrance B, and the trap is in condition to receive another visitant.

Figure 3:
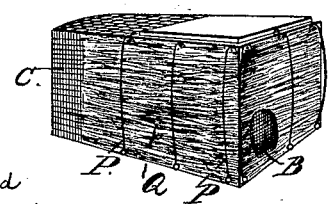
Figure 3 is a perspective view of the trap, this figure being more particularly designed to illustrate the application of straw to the exterior of the trap, which constitutes one of the features of the invention specified in the following description.

In this manner the operation is repeated, the trap being adapted to "set itself" as often as an animal is entrapped. The pointed guards or prongs $s$ prevent the rat from raising the door F when confined within the cage C. The slot or opening D precludes the collection of dirt, &c., beneath the platform J, and thus insures the more perfect operation of the latter. The hinged top $D^2$ renders the interior of the trap accessible for cleaning purposes, or for such manipulation as may be required. The rats are removed from the cage C for final disposition through the hinged door at R. P P represent a series of retaining wires attached to the exterior of the trap by means of staples, and employed to confine a layer of straw or hay, Q, fig. 3, which gives to the trap an external appearance similar to a package of the article in question, and thus obviates the suspicion which is believed to frequently prevent the rat from entering. The disk G is very light, and hence little force is required to tilt the bar I, and thus open and close the entrance. In my contrivance I have avoided the use of spring-triggers, catches, &c., and yet provided an effective, cheaper, and more durable arrangement for effecting the desired end.

Having thus described my invention, the following is what I claim as new herein, and desire to secure by Letters Patent:

1. I claim the movable disk G, operating in combination with the tilting bar I, substantially as and for the purpose specified.

2. In combination with the above, I claim the pivoted platform J, arm K, connecting-rod L, lever M, and door F, arranged in relation to the apartments A and C, as and for the purposes explained.

3. The retaining wires P, substantially as and for the purposes described.

The above specification of my improvement in rat-traps signed this twenty-eighth day of February, 1867.

HARRISON OGBORN.

Witnesses:
 EDM. F. BROWN,
 GEO. W. WOOD.